(No Model.)
C. W. YOUNG.
CART BRAKE.
No. 432,219. Patented July 15, 1890.
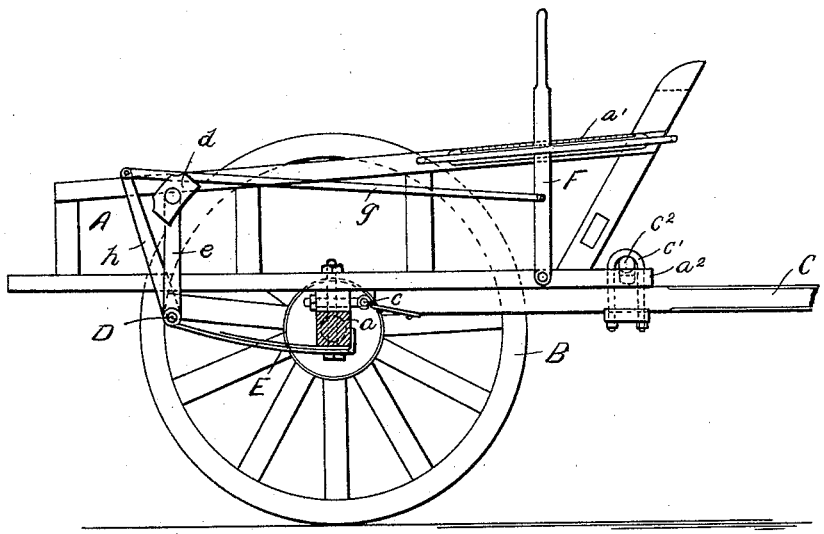

UNITED STATES PATENT OFFICE.

CHARLES W. YOUNG, OF EASTON, PENNSYLVANIA.

CART-BRAKE.

SPECIFICATION forming part of Letters Patent No. 432,219, dated July 15, 1890.

Application filed January 28, 1890. Serial No. 338,335. (No model.)

*To all whom it may concern:*

Be it known that I, CHARLES W. YOUNG, a citizen of the United States, residing at Easton, in the county of Northampton and State of Pennsylvania, have invented certain Improvements in Spring Cart-Brakes, of which the following is a specification.

This invention relates to certain improvements in brakes adapted more especially to two-wheeled vehicles, such as dumping-carts. Heretofore such vehicles have been provided with brakes, and they have been connected to the body so as to cause the whole brake-rigging to turn therewith. The great objection, however, to the use of brakes on two-wheeled vehicles has been that the movement of the vehicle when the brakes are applied causes a downward pressure upon the horse's back, which pressure is apt to be very jerky and excessive at intervals owing to the irregularities of the wheel and the practical rigidity of the brake-blocks. The effect of this action upon the horse is so injurious that a brake is very generally dispensed with on such vehicles in spite of the decided advantages attending its use.

The object of my invention is to provide a brake which will avoid this great objection and I attain this object by the mechanism illustrated in the accompanying drawing, which is an elevation of a cart having my improved brake applied thereto. One wheel is removed and the axle is shown in section.

The cart-body A is rigidly secured to the axle $a$, upon the ends of which the wheels B are secured. The shafts C are hinged at $c$ to the cart body or axle, and the forward end of the body A is secured to the shafts by means of a removable cross-bar $c^2$, which is passed through the bend of the U-bolts $c'$, the latter being secured to shafts C and projecting upward through slots in the forwardly-projecting arms $a^2$ of the cart-body. This cart is of a form commonly used for conveying and dumping earth, &c., and I will now describe a preferred manner of applying my invention thereto.

To the under side of the axle $a$ are secured two springs E, each formed of one or more steel plates or "leaves." These springs extend rearward and terminate at their free ends in suitable loops or eyes, by means of which the transverse brake-shaft D is supported. To this shaft arms $e$, carrying at their ends pivoted brake-blocks $d$, are secured, and also an arm $h$, which is connected by means of a rod $g$ to an operating-lever F. This lever is itself pivoted to the forward portion of the cart-body, and is adjustably locked thereto by means of a rack $a'$, which is engaged by a detent on the lever.

When the brake-blocks $d$ are applied to the wheels by a forward movement of the operating-lever, a strain is brought upon the springs E, which yield as the pressure put upon the blocks is increased. The strength of the spring is preferably such that the braking pressure applicable will be just insufficient to entirely stall the wheel, which practice results in wearing a flat place upon the wheel tire or tread. The effect, however, of applying the braking-power through the medium of the springs, as described, is that any irregularities in the tread of the wheels, due to all points not being perfectly concentric with the center of rotation, fail to have the effect which is inevitable when the blocks are rigidly applied—that is, of putting an irregular and excessive strain upon the horse—due to the wedge-like action of the irregular tread of the rotating wheel upon the brake-blocks, which blocks are in the ordinary construction practically solid with the cart. In my construction, however, these irregularities merely cause a slight increase or decrease in the flexure of the spring E without any appreciable change in the block pressure.

It is evident that the blocks $d$ may be applied to any preferred point with relation to the wheel-center, the arrangement of the mechanism being readily changed, if required, without departing from the spirit of my invention.

What I claim is—

In combination with a cart having the body portion fast to the axle and the shafts hinged thereto, springs E, secured to said axle and extending rearwardly therefrom, a brake-shaft pivotally connected to the free ends of said springs and carrying brake-blocks, an operating-lever pivoted to the cart-body and connected with said brake-shaft, and a locking mechanism for said lever, all substantially as set forth.

In testimony whereof I affix my signature in presence of two witnesses.

CHARLES W. YOUNG.

Witnesses:
 ALLEN F. JACOBY,
 ALFRED WALTER.